United States Patent
Lin et al.

(10) Patent No.: US 12,548,158 B2
(45) Date of Patent: Feb. 10, 2026

(54) ULTRASOUND IMAGING SYSTEM HAVING DIGITAL ULTRASONIC IMAGING DEVICES

(71) Applicant: KONINKLIJKE PHILIPS N.V., Eindhoven (NL)

(72) Inventors: Qi Zhong Lin, Shanghai (CN); Zhouye Chen, Shanghai (CN); Jianan Wang, Shanghai (CN); Jingping Xu, Shanghai (CN); Ling Tong, Shanghai (CN); Jin Ning Chen, Fuzhou (CN); Xiang Hui Bai, Shanghai (CN); Thanasis Loupas, Kirkland, WA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 18/816,014

(22) Filed: Aug. 27, 2024

(65) Prior Publication Data

US 2025/0078277 A1 Mar. 6, 2025

(30) Foreign Application Priority Data

Aug. 31, 2023 (WO) ................ PCT/CN2023/116148

(51) Int. Cl.
*G06T 7/00* (2017.01)
*A61B 8/00* (2006.01)

(52) U.S. Cl.
CPC ............ *G06T 7/0016* (2013.01); *A61B 8/461* (2013.01); *A61B 8/481* (2013.01); *G06T 2200/24* (2013.01); *G06T 2207/10132* (2013.01); *G06T 2207/20081* (2013.01); *G06T 2207/20084* (2013.01); *G06T 2207/30004* (2013.01)

(58) Field of Classification Search
CPC .............. G06T 7/0016; G06T 2200/24; G06T 2207/10132; G06T 2207/20081; G06T 2207/20084; G06T 2207/30004; G06T 2207/10016; A61B 8/461; A61B 8/481
See application file for complete search history.

(56) References Cited

U.S. PATENT DOCUMENTS

| | | |
|---|---|---|
| 2011/0230765 A1 | 9/2011 | Guracar |
| 2017/0265846 A1 | 9/2017 | Sui et al. |
| 2017/0273666 A1 | 9/2017 | Yang et al. |
| 2018/0150382 A1* | 5/2018 | Al-Jarro .............. G06F 11/3466 |
| 2021/0327127 A1* | 10/2021 | Hinterstoisser ......... G06T 19/20 |
| 2021/0343001 A1* | 11/2021 | Grama .................. G03F 7/7065 |
| 2022/0058776 A1* | 2/2022 | Ozcan .................. G06T 3/4046 |

(Continued)

OTHER PUBLICATIONS

Schäfer, S. et al., "Semi-automatic motion compensation of contrast-enhanced ultrasound images from abdominal organs for perfusion analysis," Computers in Biology and Medicine, 2015, vol. 63, pp. 229-237.

(Continued)

*Primary Examiner* — Bo Joseph Peng

(57) ABSTRACT

A system for providing contrast enhanced ultrasound (CEUS) images is described. The CEUS system includes an ultrasound probe adapted to provide the ultrasound images; a processor configured to determine out-of-plane frames of the ultrasound images, and remove the out-of-plane frames from the ultrasound images based on a criterion to provide an optimized set of frames; and a display in communication with the processor and configured to display the optimized set of frames.

20 Claims, 13 Drawing Sheets

(56) References Cited

U.S. PATENT DOCUMENTS

2022/0087651 A1     3/2022    Alizad et al.
2025/0028300 A1*   1/2025    Balzer ................... G06V 10/82

OTHER PUBLICATIONS

Wang, Z. et al., "Image Quality Assessment: From Error Visibility to Structural Similarity," IEEE Transactions on Image Processing, 2004, vol. 13, No. 4, pp. 600-612.

Akhbardeh, A. et al., "A multi-model framework to estimate perfusion parameters using contrast-enhanced ultrasound imaging," Medical Physics, 2019, vol. 46, No. 2, pp. 590-600.

Koch, G. et al., "Siamese Neural Networks for One-shot Image Recognition," Proceedings of the 32nd International Conference on Machine Learning, France, 2015, vol. 37, 8 pages.

Schroff, F. et al., "FaceNet: A Unified Embedding for Face Recognition and Clustering," arXiv:1503.03832v3, 2015, 10 pages.

* cited by examiner

1102

ULTRASOUND IMAGING SYSTEM HAVING DIGITAL ULTRASONIC IMAGING DEVICES

CROSS-REFERENCE TO PRIOR APPLICATIONS

This application claims the benefit of Chinese Application No. PCT/CN2023/116148, filed Aug. 31, 2023, the contents of which are herein incorporated by reference.

FIELD OF THE INVENTION

The invention relates to an ultrasound imaging system having digital ultrasonic imaging devices.

BACKGROUND OF THE INVENTION

Contrast enhanced ultrasound (CEUS) is an ultrasound imaging technique used in a variety of clinical applications. CEUS can detect the nonlinear signals received from microbubbles which circulate in the blood stream after an intravenous injection of an ultrasound contrast agent. As such CEUS imaging allows for documentation of tissue perfusion due to comparatively slow flow at the capillary level, as well as visualizing blood flow in arteries and veins. As a result, CEUS is capable at providing dynamic visualization of blood flow at both the macro- and micro-circulation levels. Among other clinical applications, CEUS imaging mode is recommended in the diagnosis and treatment of lesions on the liver, which may be malignant.

A sonographer typically operates a probe to gather images and loops that can span a few minutes. The representative images and loops gathered by the sonographer are often then sent to another location for review of the data by a radiologist or other trained clinician, for example. In some cases, a radiologist/clinician performs the sonogram, gathering/evaluating frames and loops used in diagnosis and treatment of medical condition. Moreover, radiologists/clinicians typically review cases in a remote workstation without being present during the CEUS exam which is the case at the radiology department in USA. So, the data from the procedure must be stored and transmitted from the location of the sonographer to the radiologist/clinician. This data transfer can be challenging due to the comparatively long duration of the acquired CEUS sequences.

During a CEUS procedure, scans are often taken in a two-dimensional plane through the portion of the body (e.g., the liver) being examined. A large number of frames and loops are gathered during the procedure and are sent for review by a trained clinician such as a radiologist/clinician. As will be appreciated, when a sonographer is taking a scan of a region of interest (ROI), there are many sources of movement that can impact the quality of the images being gathered. For example, movement of the patient due to breathing can result in a shift in the location of the image plane, resulting images out of the image plane of the current scan, and ultimately in images lesser quality and unproductive scans.

While some types of motion compensation are used to reduce the impact of the respiratory motion on the images being gathered, motion artifacts in the form of out-of-plane images remain when using known advanced CEUS imaging systems. Of the comparatively large amount of image data gathered in a scan, much of the data can be out-of-plane and of undesirable quality due to motion during a CEUS scan. These data are often stored in memory and are transmitted to the clinician for reviewing. As will be appreciated, more stored data or transmitted data, or both, places a burden on the computer system used to store, transmit and share the image data from the scan. These large amounts out-of-plane image data, which are of lesser quality and thus not useful to the clinician reviewing the images, are stored in ever-scarce memory. Moreover, the clinician reviewing the scans from a CEUS procedure has to sort through many images to find the images of sufficient quality to properly assess the patient's condition. As such, not only are out-of-plane image data a drain on memory resources, but also they occupy the clinician's time during review of the CEUS procedure.

What is needed is a system that overcomes at least the noted drawbacks of known systems set forth above.

SUMMARY OF THE INVENTION

The invention is defined by the independent claims. The dependent claims define advantageous embodiments.

According to an embodiment of the present disclosure, a system for providing contrast enhanced ultrasound (CEUS) images comprises: an ultrasound probe adapted to provide the ultrasound images; a processor; a tangible, non-transitory computer-readable medium that stores instructions, which when executed by the processor causes the processor to: generate time-intensity-curves for the ultrasound images; determine, based on the time-intensity-curves, out-of-plane frames of the ultrasound images; remove the out-of-plane frames from the ultrasound images based on a criterion to provide an optimized set of frames; and a display in communication with the processor and configured to display the optimized set of frames.

According to another embodiment of the present disclosure, a tangible, non-transitory computer-readable medium stores instructions, which when executed by a processor, cause the processor to: generate time-intensity-curves for the ultrasound images; determine, based on the time-intensity-curves, out-of-plane frames of contrast enhanced ultrasound images (CEUS); remove the out-of-plane frames from ultrasound images based on a criterion to provide an optimized set of frames; and a display in communication with the processor and configured to display the optimized set of frames.

According to another embodiment of the present disclosure, a method of providing ultrasound images is disclosed. In particular, the method discloses: generating time-intensity-curves for the ultrasound images; determining, based on the time-intensity-curves, out-of-plane frames of the ultrasound images; removing the out-of-plane frames from the ultrasound images based on a criterion to provide an optimized set of frames; and displaying the optimized set of frames.

According to another embodiment of the present disclosure, a method of displaying an optimized time-arranged sequence of contrast-enhanced ultrasound (CEUS) images is disclosed. The method discloses obtaining a source of a CEUS image sequence comprising a plurality of image frames, extracting a high-level feature from each of the plurality of image frames, obtaining a pre-trained model comprising a plurality of images with high-level image features in an optimal scan plane, comparing the extracted high-level feature to the respective high-level image features in the provided pre-trained model, determining (302) which of the plurality of image frames in the CEUS sequence is an out-of-plane frame based on the comparing step and a criterion, generating an optimized set of CEUS frames by removing (304) a determined out-of-plane frame, and displaying (306) the optimized set of CEUS frames. In a preferred embodiment, the pre-trained model is a Siamese Network with Triplet Loss trained on a plurality of time-sequenced ultrasound image frames, also referred to as cineloops, having a known minimal motion artifact.

These and other aspects of the invention will be apparent from and elucidated with reference to the embodiments described hereinafter.

BRIEF DESCRIPTION OF THE DRAWINGS

The representative embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION OF EMBODIMENTS

Figure 1:
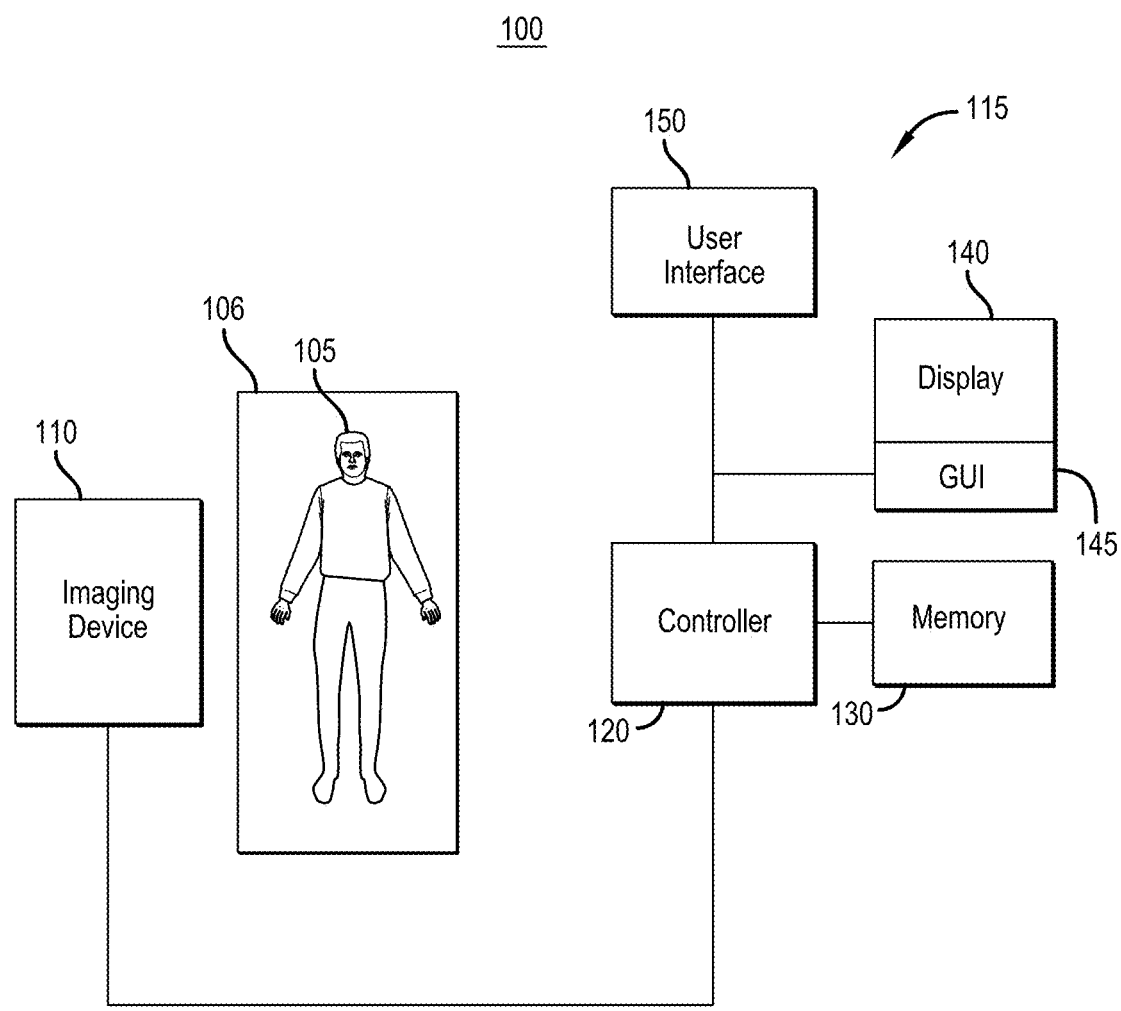
FIG. 1 is a simplified block diagram of a CEUS imaging system for imaging a portion of a body, according to a representative embodiment.

In the following detailed description, for the purposes of explanation and not limitation, representative embodiments disclosing specific details are set forth in order to provide a thorough understanding of an embodiment according to the present teachings. Descriptions of known systems, devices, materials, methods of operation and methods of manufacture may be omitted so as to avoid obscuring the description of the representative embodiments. Nonetheless, systems, devices, materials and methods that are within the purview of one of ordinary skill in the art are within the scope of the present teachings and may be used in accordance with the representative embodiments. It is to be understood that the terminology used herein is for purposes of describing particular embodiments only and is not intended to be limiting. The defined terms are in addition to the technical and scientific meanings of the defined terms as commonly understood and accepted in the technical field of the present teachings.

It will be understood that, although the terms first, second, third, etc. may be used herein to describe various elements or components, these elements or components should not be limited by these terms. These terms are only used to distinguish one element or component from another element or component. Thus, a first element or component discussed below could be termed a second element or component without departing from the teachings of the inventive concept.

The terminology used herein is for purposes of describing particular embodiments only and is not intended to be limiting. As used in the specification and appended claims, the singular forms of terms "a," "an" and "the" are intended to include both singular and plural forms, unless the context clearly dictates otherwise. Additionally, the terms "comprises," "comprising." and/or similar terms specify the presence of stated features, elements, and/or components, but do not preclude the presence or addition of one or more other features, elements, components, and/or groups thereof. As used herein, the term "and/or" includes any and all combinations of one or more of the associated listed items.

As described more fully below, the present teachings relate to a CEUS system, method and tangible, non-transitory computer readable medium that provide a contrast enhanced ultrasound (CEUS) workflow with representative short, limited numbers of frames, or loop selections, or both. Among other benefits, the workflow according to the present teachings reduces the time and effort needed for the review procedure since 1) a necessary subset of representative images with TIC (time intensity-curve) curves as well as two pre-contrast B-mode images are transferred to the workstation; and 2) the radiologist's or other trained clinician's effort is concentrated in reviewing comparatively smaller datasets containing essential diagnostic information, which is automatically abstracted from the entire CEUS cine-loop (cinematic loop). This novel CEUS workflow will simplify and facilitate the CEUS image acquisition and interpretation efforts. As such, the CEUS system, method and tangible, non-transitory computer readable medium that provide a CEUS workflow provide a beneficial practical application and improvements in this and potentially other technical fields.

FIG. 1 is a simplified block diagram of an imaging system 100 for imaging a region of interest of a subject, according to a representative embodiment.

Referring to FIG. 1, the imaging system 100 comprises an imaging device 110 and a computer system 115 for controlling imaging of a region of interest in a patient 105 on a table 106. The imaging device 110 is illustratively an ultrasound imaging system capable of providing a contrast enhanced ultrasound (CEUS) image scan of a region of interest (ROI) of the patient 105.

The computer system 115 receives image data from the imaging device 110, and stores and processes the imaging data according to representative embodiments described herein. The computer system 115 comprises a controller or processor 120, a memory 130, a display 140 comprising a graphical user interface (GUI) 145, and a user interface 150. The display 140 may also include a loudspeaker (not shown) to provide audible feedback.

The memory 130 stores instructions executable by the controller 120. When executed, and as described more fully below, the instructions cause the controller 120 to allow the user to perform different steps using the GUI 145 or the user interface 150, or both, and, among other tasks, to initialize an ultrasound imaging device comprising a transducer. In addition, the controller 120 may implement additional operations based on executing instructions, such as instructing or otherwise communicating with another element of the computer system 115, including the memory 130 and the display 140, to perform one or more of the above-noted processes.

The memory 130 may include a main memory and/or a static memory, where such memories may communicate with each other and the controller 120 via one or more buses. The memory 130 stores instructions used to implement some or all aspects of methods and processes described herein.

As will become clearer as the present description continues, the instructions stored in memory 130 may be referred to as "modules," with different modules comprising executable instructions, which when executed by a processor, carry out the various functions described in connection with various representative embodiments described below. These modules include but are not limited to a module to automatically identify out-of-plane (OOP) frames and loops, and remove them, and a module to select representative frames and short loops of images for storing, or transmission to a radiologist or other clinician for review.

The memory 130 may be implemented by any number, type and combination of random-access memory (RAM) and read-only memory (ROM), for example, and may store various types of information, such as software algorithms, which serves as instructions, which when executed by a processor cause the processor to perform various steps and methods according to the present teachings. Furthermore, updates to the methods and processes described herein may also be provided to the computer system 115 and stored in memory 130.

The various types of ROM and RAM may include any number, type and combination of computer readable storage media, such as a disk drive, flash memory, an electrically programmable read-only memory (EPROM), an electrically erasable and programmable read only memory (EEPROM), registers, a hard disk, a removable disk, tape, compact disk read only memory (CD-ROM), digital versatile disk (DVD), floppy disk, Blu-ray disk, a universal serial bus (USB) drive, or any other form of storage medium known in the art. The memory 130 is a tangible storage medium for storing data and executable software instructions, and is non-transitory during the time software instructions are stored therein. As used herein, the term "non-transitory" is to be interpreted not as an eternal characteristic of a state, but as a characteristic of a state that will last for a period. The term "non-transitory" specifically disavows fleeting characteristics such as characteristics of a carrier wave or signal or other forms that exist only transitorily in any place at any time.

The memory 130 may store software instructions and/or computer readable code that enable performance of various functions. The memory 130 may be secure and/or encrypted, or unsecure and/or unencrypted.

"Memory" is an example of computer-readable storage media, and should be interpreted as possibly being multiple memories or databases. The memory or database for instance may be multiple memories or databases local to the computer, and/or distributed amongst multiple computer systems or computing devices, or disposed in the 'cloud' according to known components and methods. Examples of computer readable storage media include non-transitory media such as computer memory devices that store information in a format that is readable by a computer or data processing system. More specific examples of non-transitory media include computer disks and non-volatile memories.

The processor or controller 120 is representative of one or more processing devices, and is configured to execute software instructions stored in memory 130 to perform functions as described in the various embodiments herein. The controller 120 may be implemented by field programmable gate arrays (FPGAs), application specific integrated circuits (ASICs), systems on a chip (SOC), a general-purpose computer, a central processing unit, a computer processor, a microprocessor, a graphics processing unit (GPU), a microcontroller, a state machine, programmable logic device, or combinations thereof, using any combination of hardware, software, firmware, hard-wired logic circuits, or combinations thereof. Additionally, any processing unit or processor herein may include multiple processors, parallel processors, or both. Multiple processors may be included in, or coupled to, a single device or multiple devices.

The term "processor" as used herein encompasses an electronic component able to execute a program or machine executable instruction. References to a computing device comprising "a processor" should be interpreted to include more than one processor or processing core, as in a multi-core processor. A processor may also refer to a collection of processors within a single computer system or distributed among multiple computer systems, such as in a cloud-based or other multi-site application. The term computing device should also be interpreted to include a collection or network of computing devices each including a processor or processors. Modules have software instructions to carry out the various functions using one or multiple processors that may be within the same computing device or which may be distributed across multiple computing devices.

The display 140 may be a monitor such as a computer monitor, a television, a liquid crystal display (LCD), a light emitting diode (LED) display, a flat panel display, a solid-state display, or a cathode ray tube (CRT) display, or an electronic whiteboard, for example. The display 140 may also provide a graphical user interface (GUI) 145 for displaying and receiving information to and from the user.

The user interface 150 may include a user and/or network interface for providing information and data output by the controller 120 and/or the memory 130 to the user and/or for receiving information and data input by the user. That is, the user interface 150 enables the user to operate the imaging device as described herein, and to schedule, control or manipulate aspects of the imaging system 100 of the present teachings. Notably, the user interface 150 enables the controller 120 to indicate the effects of the user's control or manipulation. The user interface 150 may include one or more of ports, disk drives, wireless antennas, or other types of receiver circuitry. The user interface 150 may further connect one or more interface devices, such as a mouse, a keyboard, a mouse, a trackball, a joystick, a microphone, a video camera, a touchpad, a touchscreen, voice or gesture recognition captured by a microphone or video camera, for example.

Notably, the controller 120, the memory 130, the display 140, the GUI 145 and the user interface 150 may be located away from (e.g., in another location of a building, or another building) the imaging device 110 operated by a sonographer. The controller 120, the memory 130, the display 140, the GUI 145 and the user interface 150 may be, for example, located where the radiologist/clinician is located. Notably, however, additional controllers, the memories, displays, GUI and user interfaces may be located near the sonographer and are useful in effecting the various functions of the imaging device 110 needed to complete the CEUS scans contemplated by the present teachings.

Figure 2A:
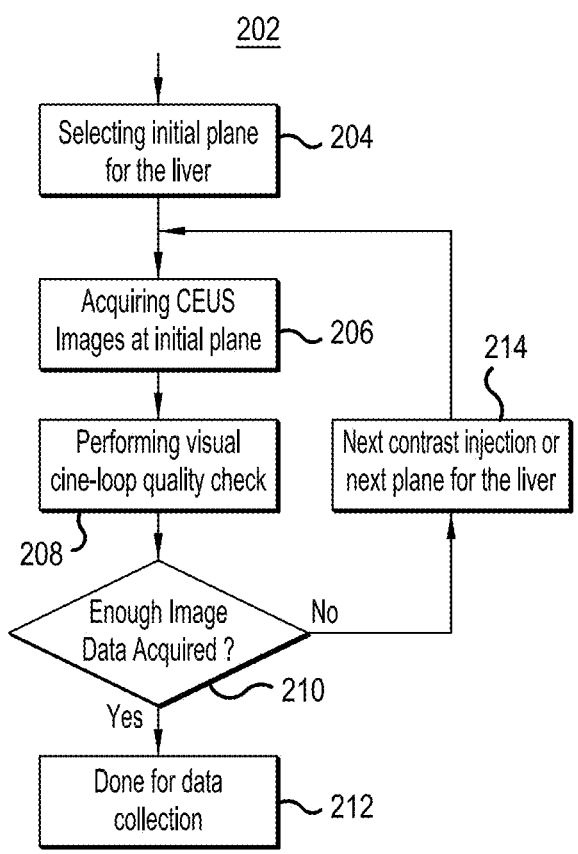
FIG. 2A is a flow chart of a method of collecting images using the CEUS imaging system of FIG. 1 to provide frames of images for a clinician for review according to a representative embodiment.

FIG. 2A is a flow chart of a method 202 of collecting images using the CEUS imaging system of FIG. 1 to provide frames of images for a clinician for review according to a representative embodiment. Various aspects and details of the method are common to those described in connection with representative embodiments of FIG. 1. These common aspects and details may not be repeated to avoid obscuring the presently described representative embodiment.

Referring to FIG. 2A, an initial plane for imaging the liver is selected at 204 and a CEUS image is acquired at the initial plane at 206. That is, at 204 the sonographer begins a CEUS scan at an initial location, such as at a lesion on the liver. In performing the scan, the imaging device 110 captures an image of a two-dimensional image plane (sometimes referred to as a slice), which is the initial plane, and acquiring a CEUS image is at the initial plane. The initial plane is located at a portion of the body selected for imaging, which for illustrative purposes may be a targeted lesion region at the middle of the ultrasound image. The CEUS image is acquired by putting the probe at a suitable position/orientation, then collecting incoming frames over the entire examination period of 3 to 6 minutes. As used herein and as described more fully below, an image taken in the desired image plane or not too far out of the desired image plane from where the sonographer is attempting to gather image data is referred to as being an in-plane (IP) image and includes the full region for the lesion to be examined, and is desirable for further review to aid in diagnosis or treatment. Notably, these desired in-plane frames may be referred to herein as optimized frames at least because they provide the radiologist/clinician with frames most useful in diagnosing and treating a patient, and do not include OOP frames, which are not only less useful in diagnosis and treatment of a patient, but also, if provided to the radiologist/clinician, may cause the radiologist/clinician to be burdened with reviewing a comparatively large number of less than optimal frames from the CEUS procedure.

However, and as described more fully below, relative movement of the patient and imaging device can cause the imaging device 110 to capture an image in another image plane that is not the same as the desired initial plane. For example, when the sonographer is attempting to capture an image at the selected location (e.g., the targeted lesion region), movement of the patient (e.g., caused by breathing) or an unintended movement of the imaging device 110 by the sonographer, the imaging device 110 will have moved relative to the selected location. This will cause the imaging device 110 to capture an ultrasound image from another plane different from initial plane. By contrast in a desired IP image, based on certain factors discussed more fully below, the image taken at another plane that is too far from the initial plane is referred to herein as being an OOP image, and is not desirable. According to various aspects of the present teachings described in connection with representative embodiments below, OOP images that are deemed too far out of the initial plane are and are not included in the images provided for review by a radiologist or similarly trained clinician. By one measure, in an OOP a significant portion (e.g., 70%-100%) of the targeted region for the lesion is lost in the current image frame.

After completion of 206, the method 202 proceeds to 208 for performing a visual cine-loop quality check. For example, the sonographer may review the images acquired in 206 to check the quality of the images gathered (e.g., in the 3-6 minute portion of the procedure as alluded to above).

At 210, the sonographer determines if the image data acquired is sufficient for a complete review and analysis of the condition of the anatomy being imaged. When the sonographer determines that enough image data have been acquired, the method 202 proceeds to 212 where the collected data are stored, or transmitted to another location for storage and review, or both.

When the sonographer determines that more image data is required, the method 202 continues at 214. Here a second contrast agent may be needed for the current plane or the next plane of the liver where the appearance of perfusion is not clear during the first injection period. The method 202 then returns to 206, and the procedure is repeated until it the sonographer determines at 210 that the image data acquired is sufficient for a complete review and analysis of the condition of the anatomy being imaged. The method 202 then proceeds to 212 where the collected data are stored, or transmitted to another location for storage and review, or both. As described more fully below, OOP images that are not useful for the desired imaging procedure are removed and not stored at 212. Rather the image data that are stored at 212 comprise only images that are beneath a threshold set for OOP images.

Figure 2B:
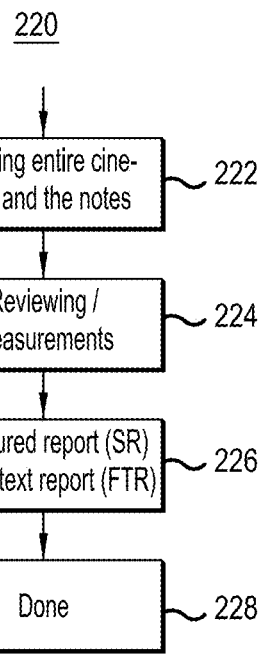
FIG. 2B is a flow chart of a method of reviewing all cinematic loops (cine loops) collected in the method of FIG. 2A by a radiologist or other trained clinician in accordance with a representative embodiment.

FIG. 2B is a flow chart of a method 220 of reviewing all cinematic loops (cine-loops) collected in the method of FIG. 2A by a radiologist or other trained clinician in accordance with a representative embodiment. Various aspects and details of the method are common to those described in connection with representative embodiments of FIGS. 1 and 2A. These common aspects and details may not be repeated to avoid obscuring the presently described representative embodiment.

At 222 the entire imaging procedure, including entire cine-loops and notes from the sonographer are loaded for review by a radiologist/clinician. By way of illustration, the imaging procedure loaded at 222 may be initially stored on a suitable memory device and transported to another location wherein the sonographer is located. Alternatively, the entire imaging procedure gathered at 212 may be transmitted (e.g., by a wired or wireless communication link) and loaded at 222 for review by the radiologist/clinician. As will be appreciated, and as will become clearer as the present description continues, by the present teachings, only the IP images are stored and transmitted for loading at 222. Beneficially, compared to known systems that include OOP and IP image data for loading for review by the radiologist/clinician, only the IP images are stored or transmitted for loading at 222. This of course reduces the memory requirements of stored image data, or bandwidth requirements for transmitted image data, or both. As such, and among other benefits, the present teachings reduce the memory requirements, or the bandwidth requirements, or both, for the collection of image data to be reviewed by the radiologist/clinician.

At 224, the image data loaded at 222 are reviewed by the radiologist/clinician and measurement are taken by the radiologist/clinician from the IP images. Beneficially, because only the IP images are stored or transmitted for loading at 222, the radiologist/clinician does not have to review less than desirable images (OOP images) at 224. By contrast, image review of known CEUS imaging systems is challenging due to the CEUS loop length (often up to 5 minutes of imaging from contrast agent injection). As such, the burden of review in not just time but mental effort by the radiologist/clinician is reduced by the system and methods of the present teachings compared to known systems and methods.

At 226 a structured report (SR) or a free text report (FTR) is generated, and at 228, the method 220 of reviewing the CEUS image data is complete.

Figure 3:
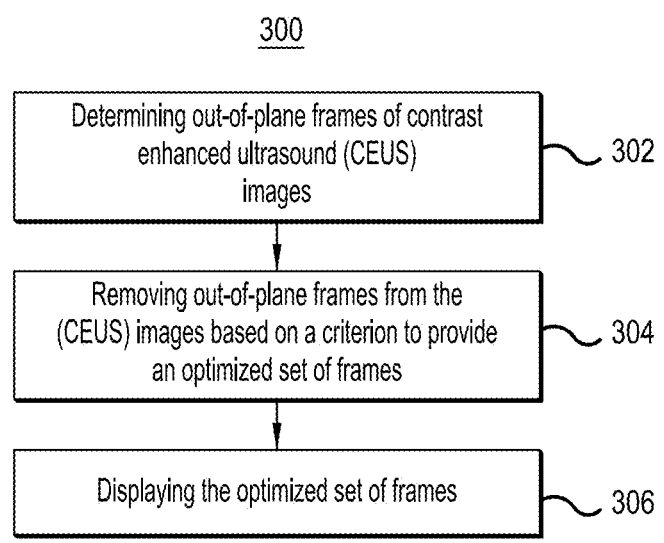
FIG. 3 is a flow chart of a method of removing out-of-plane frames according to a representative embodiment.

FIG. 3 is a flow chart of a method 300 of removing out-of-plane frames according to a representative embodiment. Modules comprising instructions, which when executed by the processor, cause the processor to carry out the method 300. Various aspects and details of the method are common to those described in connection with representative embodiments of FIGS. 1-2B. These common aspects and details may not be repeated to avoid obscuring the presently described representative embodiment.

At 302, the method 300 begins with the determining OOP frames of a CEUS imaging procedure. As described more fully below, the determining of OOP frames is carried out according to various methods. As alluded to above, and as described more fully below, instructions comprise a module and may be stored in a tangible, non-transitory computer readable medium module that when executed by a processor cause the processor to automatically identify OOP images due to patient or imaging device motion. As noted above, and as described more fully below, the OOP images are undesired artifacts for purposes of diagnosis and treatment. At 302 these OOP images are identified for removal during data acquisition by the sonographer.

At 304 the method continues with the automatic removal of OOP frames from the CEUS imaging data based on a criterion to provide an optimized set of frames of IP images. Again, instructions stored in memory 130 comprise a module for execution by a processor to remove the OOP frames.

As noted above, this removal of OOP images is carried out while the sonographer is performing the CEUS procedure, beneficially reducing the memory requirements for storing the data of the imaging procedure or the bandwidth requirements for transmitting the data of the imaging procedure, or both. As described more fully below, the criteria upon which the decision is made to remove an image from the CEUS procedure for being an OOP procedure may be based on a comparison of normalized cross-correlation coefficients (NCCC) between adjacent frames, or from a comparison of Time Intensity Curve (TIC) data from a TIC curve and the TIC data of the frames gather during the CEUS procedure. Regardless of the type of criterion selected, a comparison to a threshold value, for example, will determine whether a particular frame should be discarded as being an OOP frame, and accordingly whether a particular frame should be saved as an IP frame for further review by the radiologist or other clinician. As such, 304 results in reduced memory requirements of the imaging system 100, or the bandwidth requirements for transmission of image data by or in the imaging system 100, or both.

At 306, the method 300 is completed by the displaying of optimized sets of frames for review by the radiologist or other clinician. By way of illustration, these optimized sets of frames may be shown on the display 140 and further manipulated by the radiologist or other clinician by the GUI 145 of the imaging system 100.

Figure 4:
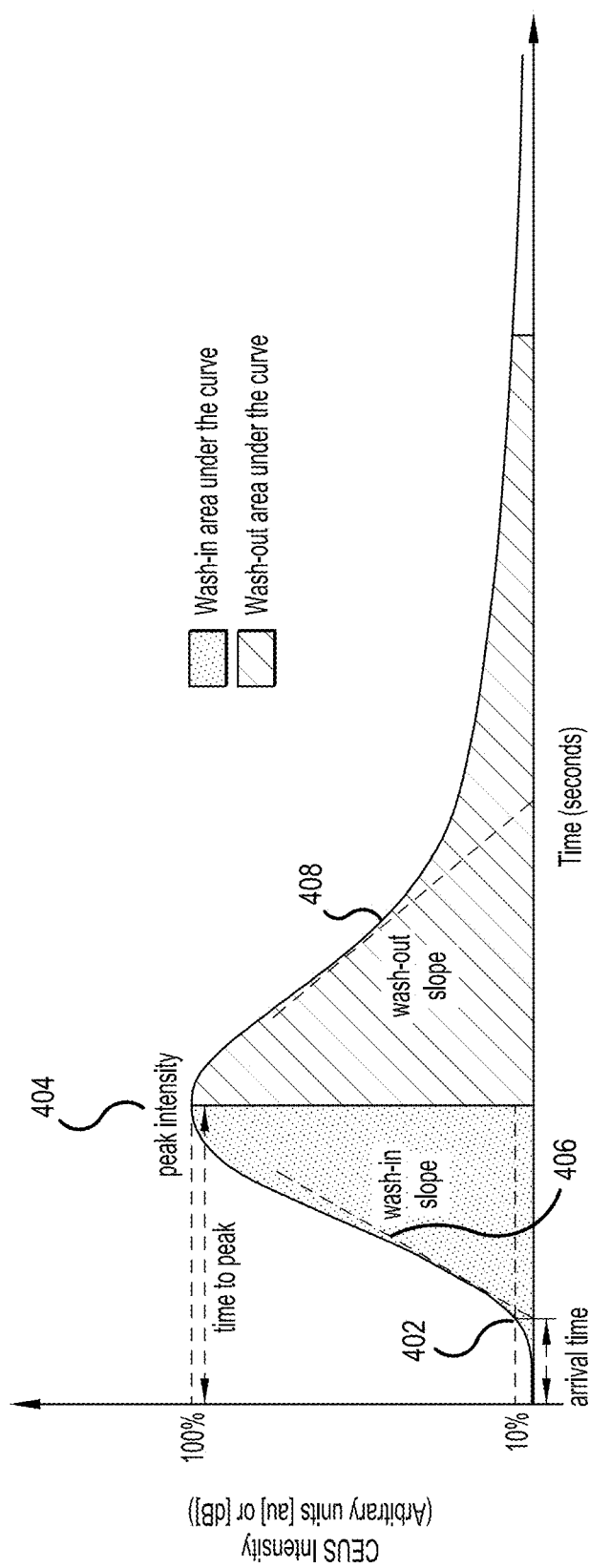
FIG. 4 is a graph of CEUS intensity versus time (also referred to as a TIC curve) for an ideal wash-in and wash-out cycle.

FIG. 4 is a graph of CEUS intensity versus time (also referred to as a TIC curve) for an ideal wash-in and wash-out cycle. Various aspects and details of FIG. 4 are common to those described in connection with representative embodiments of FIGS. 1-3. These common aspects and details may not be repeated to avoid obscuring the presently described representative embodiment.

By the present teachings, the removal of OOP frames eliminates undesired frames and redundancies within the entire cine-loop, and leaves only IP frames for review by the sonographer or other clinician. Beneficially, the remaining IP frames/short cine-loops correspond to significant events such as a phase difference of a liver resulting in onset 402 where microbubbles in the contrast agent arrive into the targeted lesion; peak time 404 where the targeted lesion shows the strongest enhancement at CEUS image; and the middle time half 406 between the onset and peak time, which often occurs 60 seconds and 120 seconds after the onset.

Figure 5:
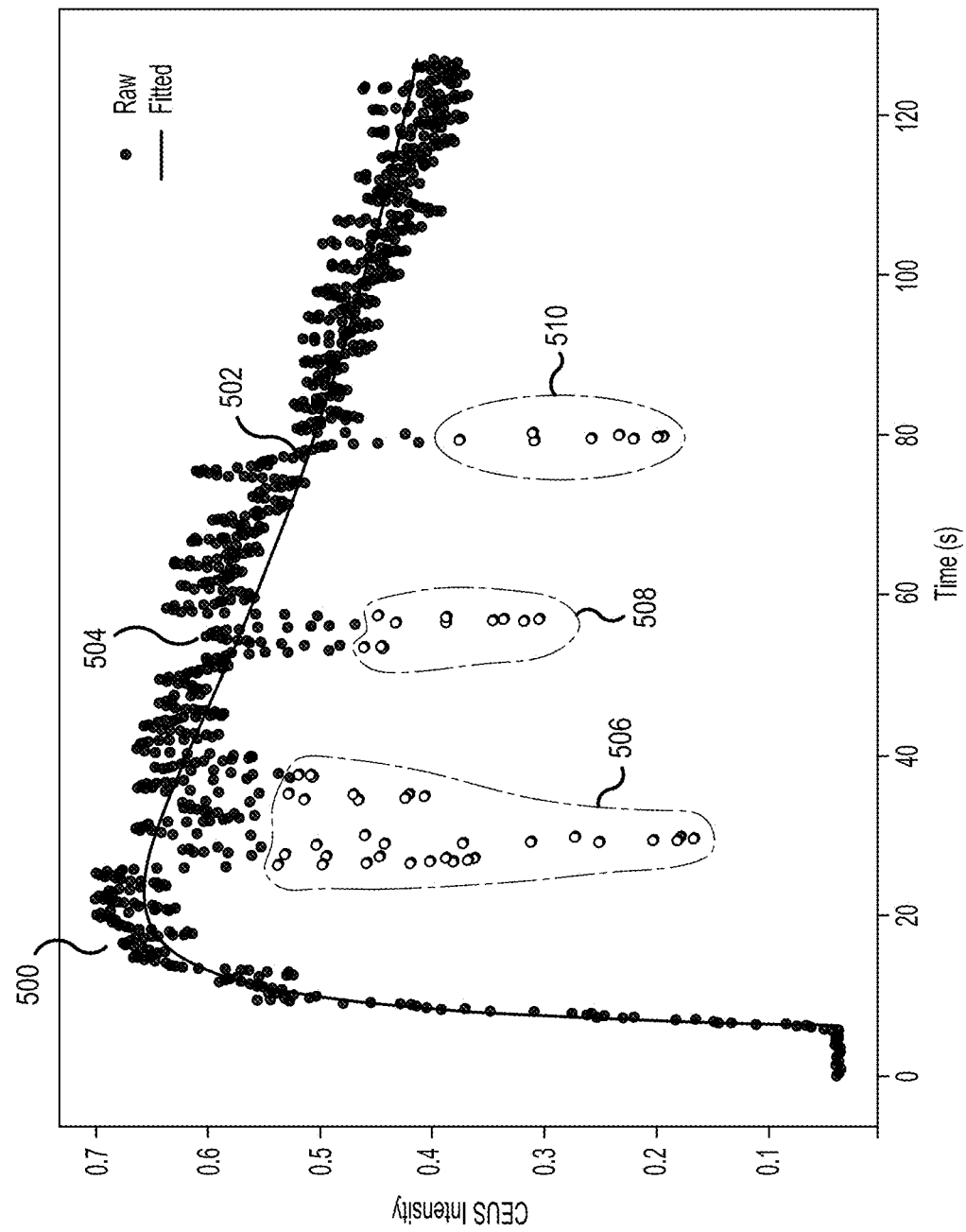
FIG. 5 is a graph of CEUS intensity versus time curve (TIC curve) and a fitted TIC curve based on actual data gathered the CEUS imaging system of FIG. 1 according to a representative embodiment.

FIG. 5 is a graph of CEUS intensity versus time curve (TIC curve) and a fitted TIC curve based on data gathered the CEUS imaging system of FIG. 1 according to a representative embodiment. Various aspects and details of FIG. 5 are common to those described in connection with representative embodiments of FIGS. 1-4. These common aspects and details may not be repeated to avoid obscuring the presently described representative embodiment.

Turning to FIG. 5, raw data of curve 500 are the CEUS intensity at various temporal points taken from a CEUS scan of a liver. Illustratively, these data are collected by the sonographer who has identified a targeted suspected lesion either manually or automatically. The suspected lesion can be determined from one of a number of methods such as pre-contrast B-mode image with high mechanical index (MI) (for example: MI=1.3); or from a selected frame in a CEUS loop either by its side-by-side B-mode or CEUS image, depending on the contrast ratio between lesion and background.

Notably, the raw data of curve 500 are from a relative smaller region of interest (ROI) around the targeted lesion based on the entire motion compensated CEUS loop. Fitted curve 502 is fitted curve based on the raw data of curve 500. Fitted curve 502 is made using a mathematical model specific to the anatomical part being scanned. Illustratively, the model selected to determine fitted curve 502 is a lagged normal model that determines the mean transit time (MTT) of contrast agent across the liver and is given by:

$$MTT = \mu + 1/\lambda,$$

where $\mu$ is the mean of the Lagged normal distribution; and $\lambda$ is the Péclet number, which is the ratio between the diffusive time and the convective time, estimating the contribution of both the diffusion and the convention of the microbubbles traveling through the vessels, divided by two. Further details of determining MTT values for use in connection with the present teachings may be found in "A Multi-Model Framework to Estimate Perfusion Parameters using Contrast-Enhanced Ultrasound Imaging" to Alireza Akhbardeh, et al. (Med. Phys. 46 (2), February 2019, pp. 590-600).

As will be appreciated, when applied to other anatomical elements of the body, other mathematical models, which have been found to better track the CEUS contrast intensity versus time for the specific anatomical element being studied, are used. By way of illustration and not limitation, other mathematic models include a lognormal model for the breast and heart; a gamma variate mathematic model for the carotid artery; a local density random walk (LDRW) mathematical model; and a first passage time (FTP) model for the carotid artery. These mathematic models are modules stored in memory 130 and comprise instructions, which when executed by a processor take the raw CEUS intensity data from the imaging device and calculate the fitted curve 502 for these data.

As will become clearer as the present description continues, using the systems and methods of the present teachings, average values of the data points and standard deviation from the average are determined for each data point. The average value and standard deviation are compared to a threshold to determine the data points classified as in-plane data points, and the frames of these data points will not be removed from the frame data provided to the radiologist/clinician. By contrast, data points of that are greater that exceed the threshold are removed from the data set. By way of illustration, data points 504 that are comparatively close to the fitted curve 502 are determined by the systems and methods of the present teachings to be in-plane data points. However, data sets 506, 508, 510 likely exceed the threshold, and are likely data points from another plane erroneously captured due to relative motion of the body and imaging device 110 as discussed above. These data sets are thus determined by the system and methods of the present teachings to be OOP data points and are not stored image data of the CEUS procedure, or are not transmitted to the radiologist/clinician, or both. As noted above and as described more fully below, module to automatically identify OOP frames and loops, and remove them are stored instructions in the memory 130, which are executed by a processor to carry out this identification and removal of OOP frames and loops.

FIG. 6A is a flow chart of a method 600 for determining whether a frame is an in-plane frame or an out-of-plane frame using changes in the TIC curve according to a representative embodiment. Various aspects and details of FIG. 6A are common to those described in connection with representative embodiments of FIGS. 1-5. These common aspects and details may not be repeated to avoid obscuring the presently described representative embodiment. Moreover, and as alluded to above, the method 600 is a module comprising instructions stored in memory 130. When executed by a processor, the instructions cause the processor to carry out the method 600.

At 602, a known motion compensation technique is applied to the entire cine-loop and thereby to a relatively larger region that includes the suspected lesion or whole image if necessary.

At 604 a TIC curve is generated for the comparatively smaller ROI and around the targeted lesion based on the entire motion compensated CEUS loop. By way of illustration, curve 500 is a TIC curved generated for a smaller ROI around a targeted lesion of the liver. After generation of the TIC curve, the method comprises applying a mathematical model suitable for the organ element being scanned by CEUS. Continuing with the example of FIG. 5, at this portion of the method, fitted curve 502 for the liver is generated using lagged normal model described above.

Next, at 604 of the method 600, a difference curve is generated using a difference function (diff(n)) for every temporal data point. In accordance with a representative embodiment, the fitted difference for each CEUS intensity and temporal data point n is computed as $$diff(n) = \text{abs}(OTIC(n) - FTIC(n)),$$

where OTIC is the original temporal data point, and FTIC is the fitted CEUS temporal data point n.

At 606 the method continues with the calculation of standard deviation (std) for the difference curve for every CEUS and temporal data point. In accordance with a representative embodiment, when the OTIC curve value (n) at every temporal point is outside the predetermined range the frame is deemed OOP. Just by way of illustration, the range may be expressed as (FTIC value(n)−2*std to FTIC value (n)+2*std) as shown in FIG. 6A.

At 608 the method 600 continues with the comparison of each OTIC data point with a threshold value to see if the OTIC data point is in range. In accordance with a representative embodiment, if the value of the OTIC data point is outside a pre-determined range, the frame associated with this data point is considered to be OOP frames. Just by way of illustration, as noted above data sets 506, 508, 510 are out-of-range. As alluded to above, the predetermined range relates to OTIC data points that would be in the plane of examination of the ROI (i.e., the initial plane) where the imaging device 110 is located at the specific time in the procedure. These data points are kept (stored, or transmitted, or both). By contrast, data points that are out of range would likely be data points gathered during the specific time of the procedure, but in an image plane that differs from the initial plane due to relative motion of the imaging device 110 and the body of the patient on whom the CEUS scan is being performed.

By way of illustration, the threshold for determining whether the OITC data point is in range or out of range can be determined using (FTIC value(n)−2*std to FTIC value (n)+2*std). Data points in range are kept at 610 (stored, or transmitted to the radiologist/clinician, or both) whereas data points that exceed the predetermined range are data points of OOP frames, and are removed/discarded at 612. Notably, both fitted values and OITC values are used to determine the difference function (diff(n)), and the standard deviation is useful to identify an IP or OOP frame.

Figure 6:
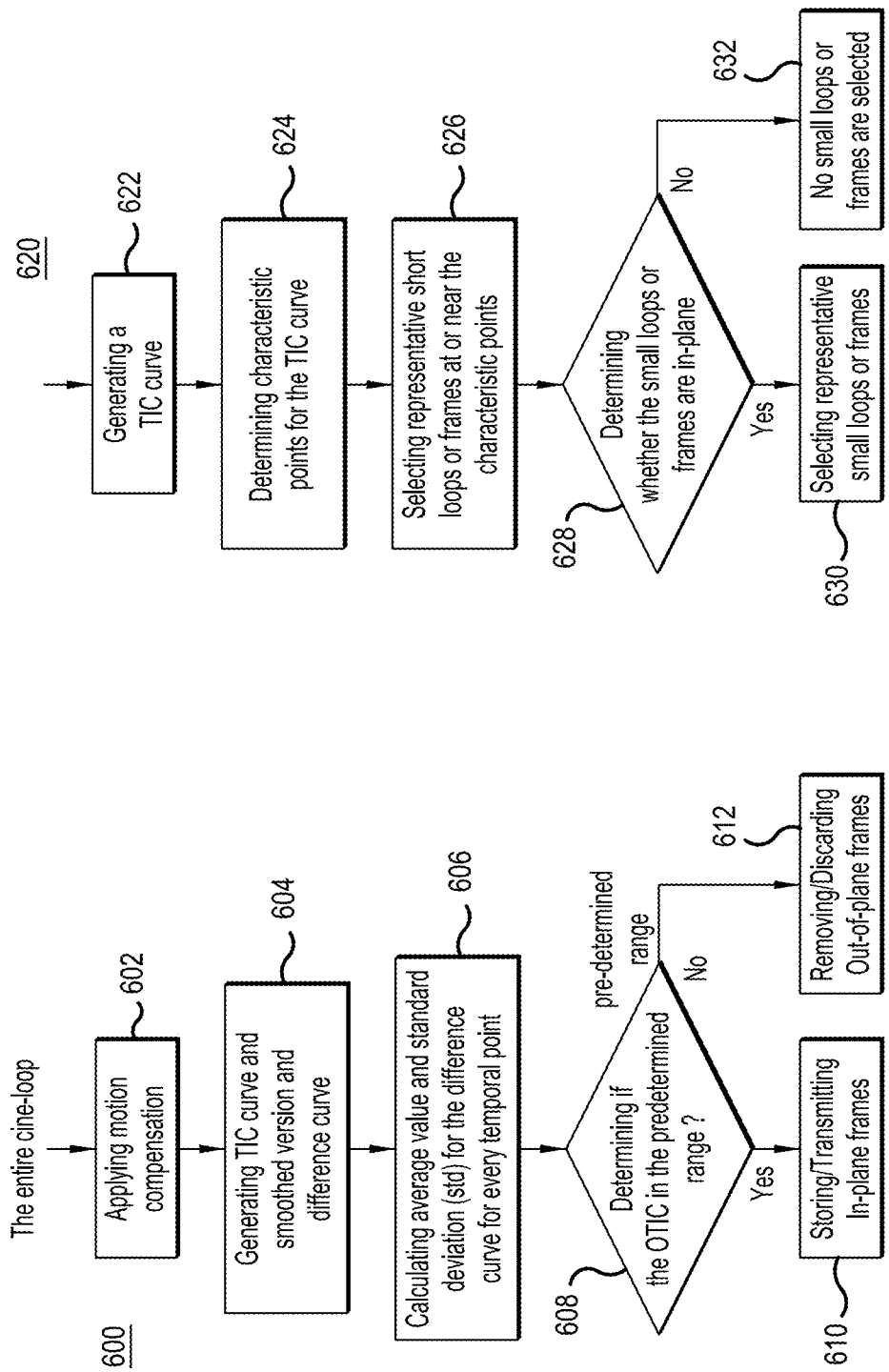
FIG. 6A is a flow chart of a method for determining whether a frame is an in-plane frame or an out-of-plane frame using changes in the TIC curve according to a representative embodiment.
FIG. 6B is a flow chart of a method of selecting representative CEUS frames or short loops at or near characteristic points of a TIC curve according to a representative embodiment.

FIG. 6B is a flow chart of a method 620 of selecting representative CEUS frames or short loops at or near characteristic points of a TIC curve according to a representative embodiment. Various aspects and details of FIG. 6B are common to those described in connection with representative embodiments of FIGS. 1-6A. These common aspects and details may not be repeated to avoid obscuring the presently described representative embodiment. Moreover, and as alluded to above, the method 620 is a module comprising instructions stored in memory 130. When executed by a processor, the instructions cause the processor to carry out the method 620.

In accordance with a representative embodiment, the TIC curve is determined at 622 such as described above.

At 624, the method 620 comprises determining characteristic points on the TIC curve to be analyzed. temporal points including, but not limited to, onset of the TIC curve (e.g., 402); middle of wash-in curve or maximal wash-in slope (e.g., 404); peak time of the TIC curve (e.g., 406); middle of wash-out or minimal wash-out slope (e.g., 408); a temporal point around 60 seconds based on the America College of Radiology CEUS Liver Imaging, Reporting and Data System (CEUS-LI-RADS); and a temporal point during LP or around 120 seconds if considering ACR CEUS-LI-RADs.

At 626 representative short loops or frames are selected at or near the characteristic points from 624. By selecting short cine-loops or frames from the entire cine-loop, data from important parts of the CEUS scan can be more easily isolated for review by the radiologist/clinician. Again, because the image data are reduced, less memory or less bandwidth are required for storing the data, or transmitting the data, or both.

At 628, the determination is made whether the selected short loops are IP or OOP loops. Notably, the methods for determining whether a loop comprises IP or OOP data is substantively the same as those used to determine whether a single frame comprises IP or OOP data. As will be appreciated each loop comprises a plurality of frames, so the noted methods to determine IP or OOP loops comprises repeating the method for each frame of the loop. In accordance with one representative embodiment, the determination of whether each frame of a loop is IP or OOP on an individual basis. IP frames of the loop are stored, and OOP frames of the loop are discarded. Accordingly, when the short loops are determined to be IP at 628, the method continues at 630. Otherwise, the method continues at 632.

Figure 7:
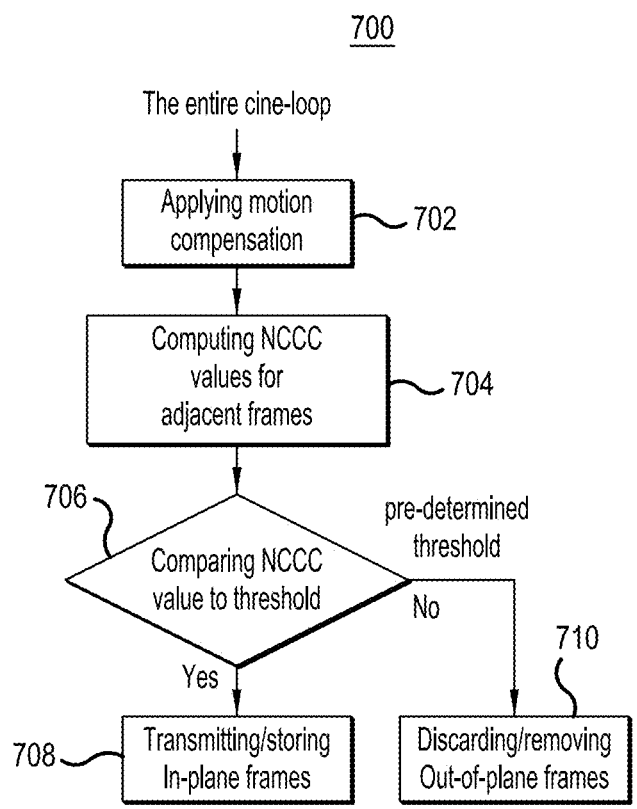
FIG. 7 is a flow chart of a method for determining whether a frame is an in-plane frame or an out-of-plane frame using a normalized cross-correlation coefficient (NCCC) between adjacent frames according to a representative embodiment.

FIG. 7 is a flow chart of a method 700 for determining whether a frame is an in-plane frame or an out-of-plane frame using changes in NCCC values according to a representative embodiment. Various aspects and details of FIG. 6B are common to those described in connection with representative embodiments of FIGS. 1-6A. These common aspects and details may not be repeated to avoid obscuring the presently described representative embodiment. Moreover, and as alluded to above, the method 700 is a module comprising instructions stored in memory 130. When executed by a processor, the instructions cause the processor to carry out the method 700.

At 702, a known motion compensation method is applied to the entire cine-loop and thereby to a relatively larger region that includes the suspected lesion or whole image if necessary.

At 704 the normalized cross-correlation coefficient (NCCC) values are calculated for two adjacent frames for a targeted lesion region based on the entire motion compensated CEUS loop. Notably, adjacent frames are frames consecutive in time and frame number (e.g., frames(n−1), n, (n+1)).

In accordance with one representative embodiment, the NCCC values ($\gamma(u, v)$) are determined by: calculating the cross-correlation in the spatial or frequency domain, depending on the size (amount of data) of the images; calculating local sums by precomputing running sums; and using the local sums to normalize the cross-correlation to obtain the correlation coefficients. This may be expressed as:

$$\gamma(u, v) = \frac{\sum_{x,y} [f(x, y) - \bar{f}_{u,v}][t(x - u, y - v) - \bar{t}]}{\left\{ \sum_{x,y} [f(x, y) - \bar{f}_{u,v}]^2 \sum_{x,y} [t(x - u, y - v) - \bar{t}]^2 \right\}^{0.5}}$$

where f is the image.
$\bar{t}$ is the mean of the template
$\bar{f}$ is the mean of f(x,y) in the region under the template.

In the equation above, f and t are functions in two spatial dimensions (x,y) and the actual values of f(x,y) and t(x,y) are used to determine the NCCC value at (x,y).

At 706 the method continues with the comparison of the NCCC values calculated in 704 to a predetermined threshold value. In accordance with a representative embodiment, the NCCC values are calculated for any two adjacent frames for a region of interest (ROI), such as the region of the targeted lesion region based on the entire motion compensated CEUS loop. Next, out-of-plane frames are determined based on a threshold comparison and removed when they are frames of the selected frames or of the selected short loops when the NCCC value is outside the range of the threshold. Just by way of illustration, in accordance with a representative embodiment, the determination of whether a frame is OOP is based on a pre-defined NCCC value (e.g., 0.75). When the NCCC value is less than this threshold, the frame is considered OOP and discarded. All other frames are deemed IP and are stored/shared with the clinician reviewing the scan.

If the NCCC value is large enough at 706, the data points are considered in-plane and at 708, the data points of these frames are stored, or transmitted to the radiologist/clinician, or both. If the NCCC value is less than the predetermined threshold, the frame associated with this data point is deemed to be an OOP frame and is discarded at 710.

An alternate embodiment for determining out-of-plane frames in a time-arranged sequence of ultrasound images, referred to also as a cineloop, may include the use of machine learning, artificial intelligence (AI), or neural networks such as convolutional neural networks (CNNs). One technique for using such a network uses a so-called trained Siamese Network which determines a similarity metric called a "distance measurement" on high-level features learned and extracted from successive frames of an ultrasound image sequence. Siamese Networks are generally known, as exemplified in "Siamese Neural Networks for One-shot Image Recognition", by Koch et al., Proceedings of the 32$^{nd}$ International Conference on Machine Learning, Lille France, 2015, W&CP volume 37. "FaceNet: A Unified Embedding for Face Recognition and Clustering", by Schroff et al., arXiv:1503.03832v3[cs.CV], 17 Jun. 2015, describes an example method that uses CNNs to identify high level features in facial images, and maps those images in a Euclidean space where distances correspond to a measure of face similarity. The training method uses triplets in order to enable the use of roughly aligned matching/non-matching face patches. The method achieves high computational efficiency. These references are incorporated by reference.

Figure 8:
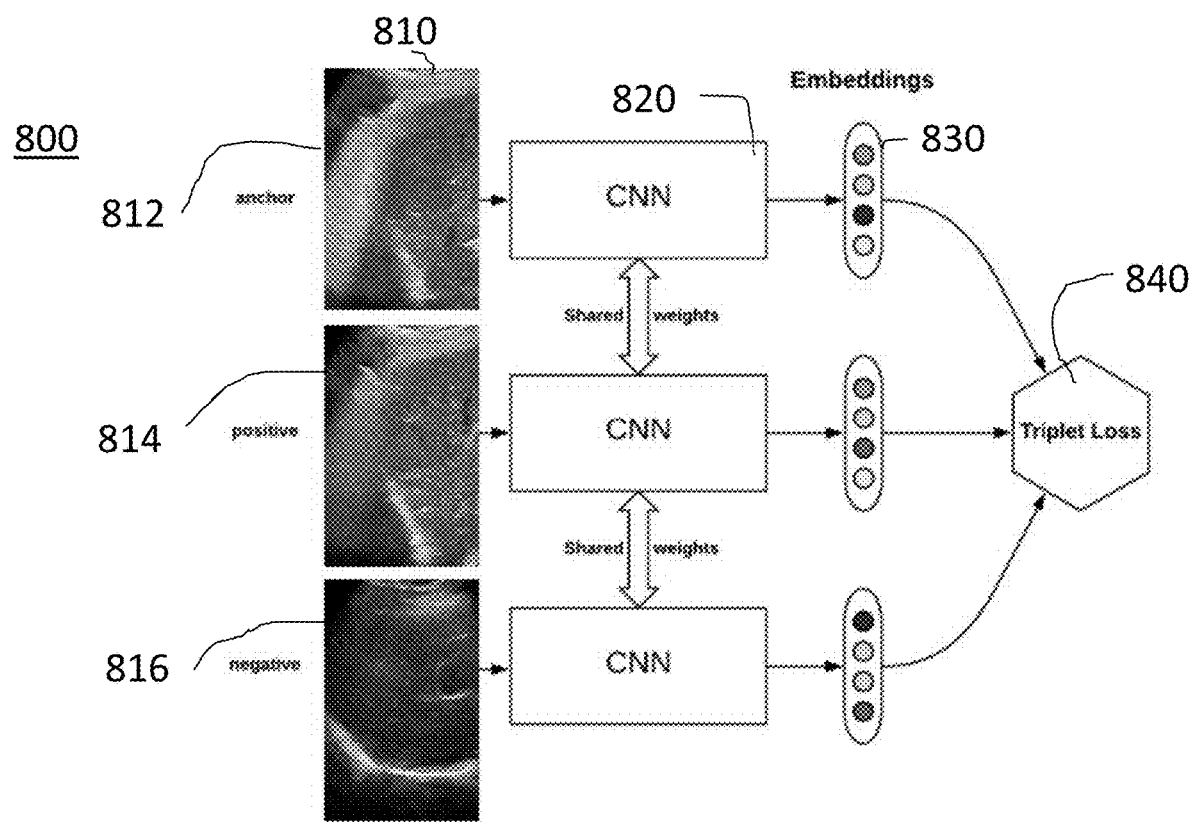
FIG. 8 is an illustrated flow diagram of a method for training a model, the model enabled for subsequent use in identifying in-plane frames or out-of-plane frames, according to a representative embodiment.

The inventors have discovered that the techniques described in the above two references may be combined, modified and applied to ultrasound out-of-frame image identification in order to achieve high accuracy and high computational efficiency as well. The inventive methods and systems described in the following embodiment may be particularly useful for contrast-enhanced ultrasound (CEUS) examinations and the reviews of the examinations by allowing the alert, flagging, or automatic removal of out-of-plane frames. FIG. 8 illustrates a training method 800 using a Siamese Network with Triplet Loss. The trained machine learning algorithm is configured to automatically detect out-of-plane frames. The algorithm is computationally efficient enough that the detection can be accomplished in real-time. Such a real-time tool may enable the system to alert the user that a target lesion or tissue structure is out-of-plane and to provide a guidance instruction to correct the issue, e.g. move the transducer probe or repeat the exam. The tool may alternatively be used in post-processing of the CEUS cineloop such that out-of-plane frames are automatically removed to reduce the reviewer review time.

In the illustrated embodiment, training method 800 takes training input from a set of cineloop ultrasound image sequences. In this embodiment, each cineloop sequence is a case that is ascertained to have only slight motion artifact throughout the sequence. Several thousand such cases are collected from CEUS examinations and are collected into the set.

For training, one frame from one case is randomly selected at selection step 810 as an anchor frame 812, a second frame from the same case is randomly selected as a positive frame 814, and a third frame from a different case is randomly selected as a negative frame 816. The three frames 812/814/816 are then input to identical or substantially identical CNNs which extract one or more high level features from each image. This extraction step is the high-level feature extraction step 820. High-level features may be defined as anatomical structures such as lesions, vessels, tissue layers/structures, bone, or connective tissue, as differentiated from low-level features such as edges, dots, corners and the like. In general, the CNNs include several hidden layers in which lower level features are identified first, and then successively evaluated to identify intermediate and then high-level features in each frame. The output of each CNN may be a feature vector comprising any high-level features in the frame. It may be noted that the CNNs may initially share weighting factors between them.

The output of each CNN is provided to an embedding step 830. In the FIG. 8 illustration, each high-level feature in the vector appears as a shaded circle. In this illustrated example, the high-level features from each CNN are represented as the feature vectors anchor vector 832, positive vector 834, and negative vector 836. Pattern similarities and differences between the vectors may be readily seen for illustrative purposes.

The high-level feature vectors 832, 834, 836 are input to the triplet loss calculation step 840. At triplet loss step 840, the three vectors are mapped into a similarity space where similar vectors are mapped closer to each other than less-similar vectors. The triplet loss is then minimized by adjusting the parameters of each CNN. At minimized triplet loss, frames from the same case, i.e. anchor and positive frames, will have minimized distance from each other. Frames from different cases, e.g. anchor and negative frames, will have maximized distance between each other.

After a sufficient number of a priori cineloops and frames are processed through the training network in the aforedescribed manner, a pre-trained model may be finalized. The pre-trained model may then be incorporated into a system or method to identify out-of-plane frames which are obtained in a real-world ultrasound CEUS examinations.

Figure 9:
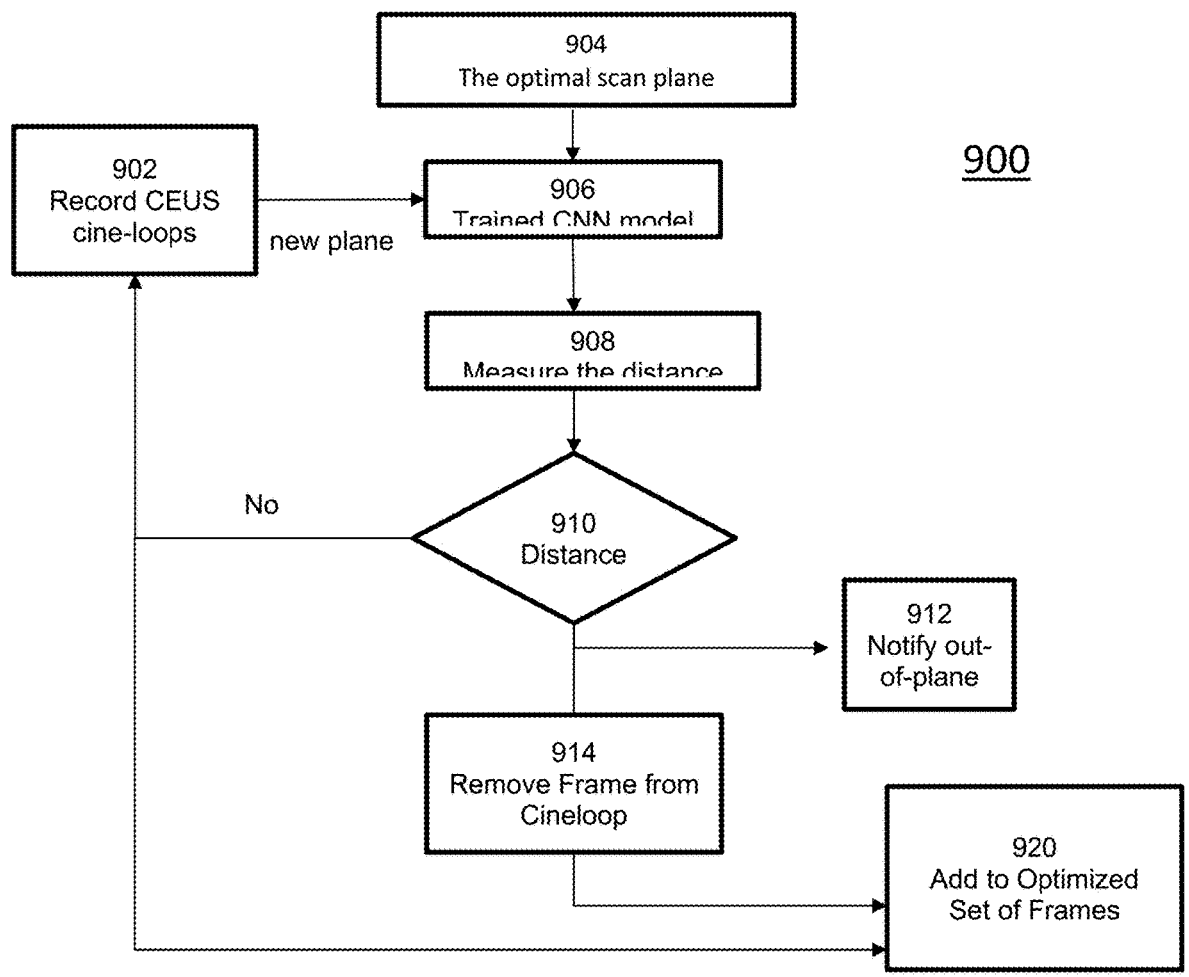
FIG. 9 illustrates a flow chart of a method for determining whether a frame is an in-plane frame or an out-of-plane frame using a pre-trained model according to a representative embodiment.

FIG. 9 illustrates a method 900 for identifying out-of-plane frames from a CEUS cineloop and/or for creating an optimized set of frames for the CEUS cineloop, according to one embodiment of the invention. Method 900 preferably incorporates the pre-trained model obtained with the Siamese Network and Triplet Loss technique as described previously. This method 900 may be used in the system as shown in FIG. 1 and/or as an alternative to the previously described methods, e.g. in method 300 or method 700, for determining out-of-plane frames of CEUS images.

Method 900 begins with providing a initial optimal scan plane at step 904. The optimal scan plan may be obtained from [please confirm where this is from: a user selection of proper plane during the exam, a previous exam of the same patient/system, etc]. The optimal scan plane is provided at step 906 into the pre-trained model as described in FIG. 8. The optimal scan plane preferably comprises one or more images with known minimal motion artifact and also having a known number of high-level image features.

At step 902, source data of interest is obtained for input into the pre-trained model. The source data may comprise a cineloop of CEUS image frames from the examination of interest obtained in real-time from an ultrasound transducer probe or from a database of images from a previous ultrsound examination. The source data may be input to the pre-trained model one frame at a time.

At step 906, the pre-trained model with the high-level features appearing in the optimal scan plane is obtained. The pre-trained model also receives the plurality of image frames from the CEUS image sequence of interest. The pre-trained model acts upon each of the plurality of image frames to identify and extract any high-level feature appearing in the frame. It may be understood that the pretrained model can be viewed as millions of model parameters learned from the aforedescribed training dataset. The pre-trained model may be physically embodied as a computer processor comprising high-level feature extraction (at step 906) and similarity calculation (at step 908).

The pre-trained model at step 908 further compares the extracted high-level feature(s) to the high-level feature(s) provided in the optimal scan plane. The comparison output is a similarity distance that is measured between the extracted feature and the provided feature. The similarity distance calculated for each image frame may optionally be normalized to a value of between 0 and 1 where the value of one indicates little similarity between the image frame and the optimal scan plane.

At step 910, the measured similarity distance is compared to a pre-selected threshold criterion. The threshold criterion may be a value between 0 and 1 above which indicates a likelihood that the image frame is out-of-lane. Examples of the threshold criterion may be seen in the example graphs of FIGS. 10*b* and 11*b* as within a range of about 0.2 to 0.8, with a particular example of 0.5. Calculated similarity distances above the threshold criterion are determined to be out-of-plane frames.

If the frame is determined to be out-of-plane, then the method proceeds at step 914 to remove the frame from the CEUS cineloop. In some embodiments, method 900 excludes the frame from being added to a new optimized set of CEUS frames constructed at step 920. Method 900 may also cause a notification alert, aural alert, user probe guidance instruction, or similar visual indication to be issued at notification step 912 in order to alert the user that an out-of-plane frame has been detected. The alert may be in the form of a message, an annotation on a particular frame, an audible alert, and the like.

If the frame is determined at step 910 to be other than out-of-plane, i.e. the similarity distance is less than the threshold criterion, the frame will be maintained in the cineloop. In some embodiments, method 900 will add the frame to the new optimized set of CEUS frames at step 920.

The optimized set of frames may be considered complete after the entire cineloop of CEUS frames is analyzed by the pre-trained model as described above. The optimized set of CEUS frames may then be stored in memory for later review and display, such as at step 306 or for generating a structured report at step 226, and the like. Later review and display may include a user interface which enables the selection of either the obtained CEUS image frames or the optimized CEUS image frames for viewing.

The aforedescribed training method 800 and method 900 may be implemented into a computer program product that is embodied in a non-transitory computer memory, such as memory 130 and into a corresponding system 100 as shown in FIG. 1 and described previously. One benefit of method 900 is the enablement of real-time out-of-plane frame detection by the use of high-level feature detection in the frames. Frame rates of 100 frames per second or more may be achieved using this embodiment.

Figure 10A:
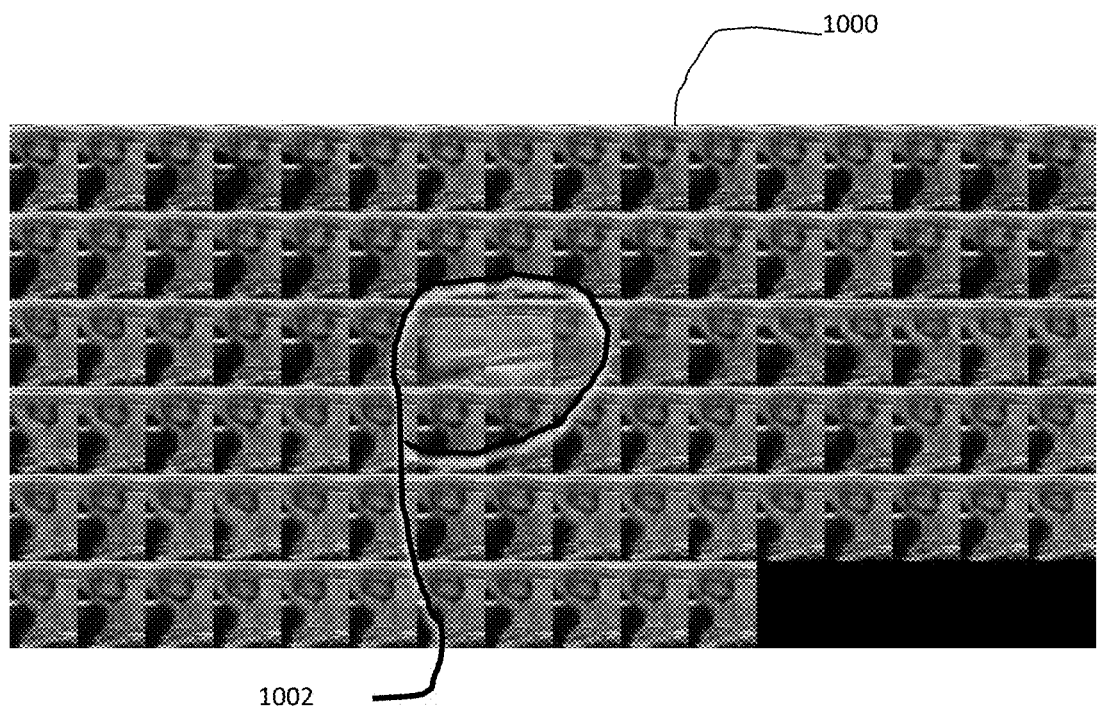
FIG. 10A.
Figure 10B:
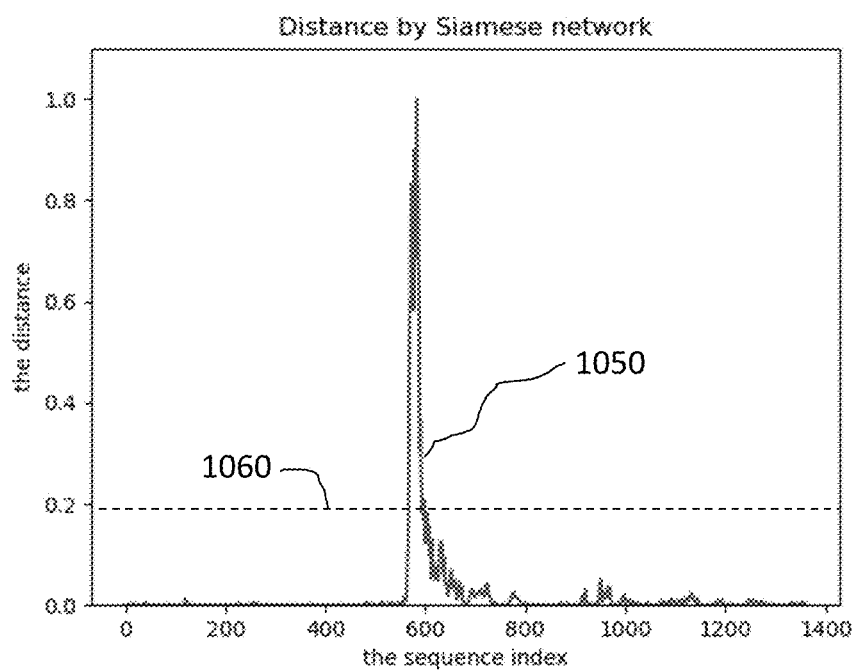
FIG. 10B, and FIG. 10C illustrate the performance of a preferred pre-trained model embodiment of the invention with respect to alternate embodiments.
Figure 10C:
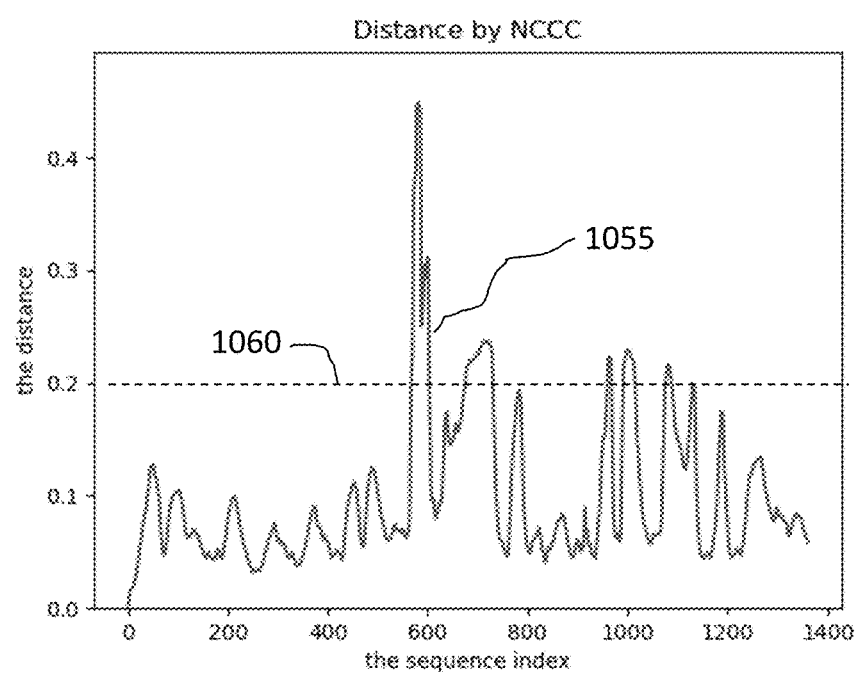

FIG. 10*a* through 10*c* illustrate the performance of method 900. FIG. 10*a* shows a cineloop sequence of ultrasound images 1000 displayed from left to right and top to bottom in a time-sequenced manner. It may be seen that some out-of-plane frames 1002 appear in the middle of the cineloop. In this case, the optimal reference plane may appear in any of the remaining frames.

FIG. 10*b* illustrates the result of the out-of-plane analysis performed by the pre-trained method 900. As can be seen, the similarity distance 1050 is plotted for each frame, along the sequence index. Only the index items corresponding to frames 1002 exceed the similarity distance threshold criterion 1060 of for example 0.2. Those frames 1002 may be excluded from the optimized set of frames with a high degree of certainty. The performance of the NCCC method as shown in FIG. 10*c* is less certain, where a number of frames that may be in-plane also have similarity distances 1055 that may exceed the similarity distance threshold criterion 1060, and thus would be unnecessarily excluded.

Figure 11A:
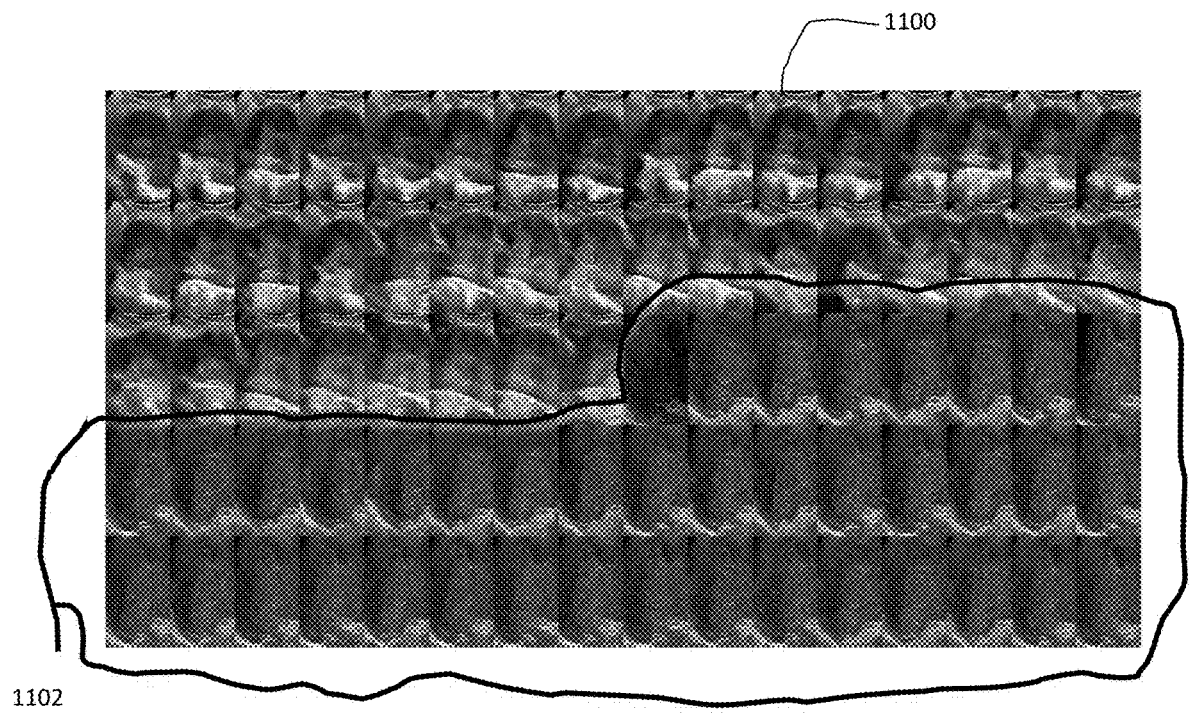
FIG. 11A, FIG. 11B, and FIG. 11C illustrate another view of the performance of a preferred pre-trained model embodiment of the invention with respect to alternate embodiments.
Figure 11B:
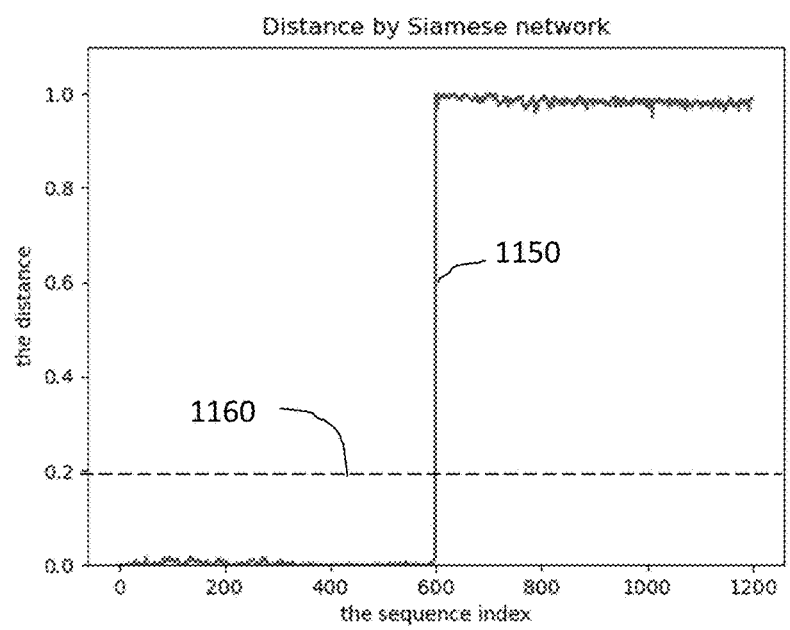
Figure 11C:
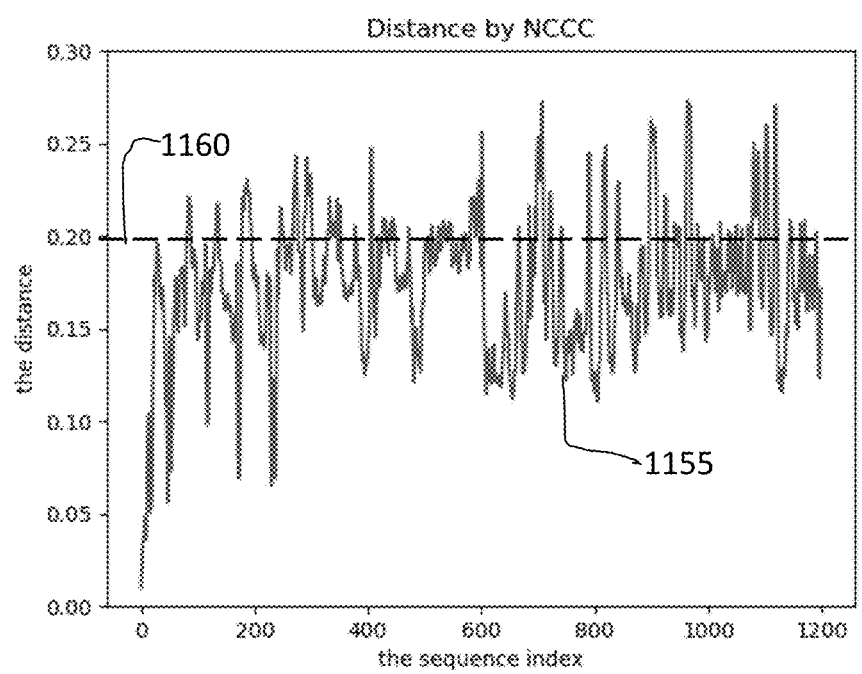

FIG. 11*a* through 11*c* show a different case performance of method 900. FIG. 11*a* shows a cineloop sequence of ultrasound images 1100 displayed from left to right and top to bottom in a time-sequenced manner. Here it may be seen that the last half of the frames, frames 1102, are out-of-plane. In this case, the optimal reference plane may appear in a beginning, or the first, frame.

FIG. 11*b* illustrates the result of the out-of-plane analysis performed by the pre-trained method 900. As can be seen, the similarity index items 1150 corresponding to frames 1102 exceed the similarity distance threshold criterion 1160 of for example 0.2. Those frames 1102 may be excluded from the optimized set of frames with a high degree of certainty. The performance of the NCCC method as shown in FIG. 11*c* is less certain, where a number of frames that may be in-plane 1155 also have similarity distances which exceed the threshold criterion 1160. Thus, these frames too may be unnecessarily excluded.

As will be appreciated by one of ordinary skill in the art having the benefit of the present disclosure, devices, systems and methods of the present teachings provide the transmission of echo image data from an ultrasound device. For example, compared to known methods and systems, various aspects of a protocol including the beginning, duration and termination of a step in the protocol can be facilitated during the generation of the protocol, or during implementation of the protocol, or both. Moreover, errors that can result from human interaction with an imaging system can be reduced thereby reducing the need to repeat procedures, and reducing the time required to complete an imaging procedure. Notably, these benefits are illustrative, and other advancements in the field of medical imaging will become apparent to one of ordinary skill in the art having the benefit of the present disclosure.

Although methods, systems and components for implementing imaging protocols have been described with reference to several exemplary embodiments, it is understood that the words that have been used are words of description and illustration, rather than words of limitation. Changes may be made within the purview of the appended claims, as presently stated and as amended, without departing from the scope of the protocol implementation of the present teachings. The preceding description of the disclosed embodiments is provided to enable any person skilled in the art to practice the concepts described in the present disclosure. As such, the above disclosed subject matter is to be considered illustrative, and not restrictive, and the appended claims are intended to cover all such modifications, enhancements, and other embodiments which fall within the true scope of the present disclosure. Thus, to the maximum extent allowed by law, the scope of the present disclosure is to be determined by the broadest permissible interpretation of the following claims and their equivalents and shall not be restricted or limited by the foregoing detailed description.

In the claims, any reference signs placed between parentheses shall not be construed as limiting the claim. The invention may be implemented by means of hardware comprising several distinct elements, and/or by means of a suitably programmed processor. In the device claim enumerating several means, several of these means may be embodied by one and the same item of hardware. Measures recited in mutually different dependent claims may advantageously be used in combination.

The invention claimed is:

1. A system for providing a time-arranged sequence of ultrasound images, the system comprising:
   a source of an ultrasound image sequence comprising a plurality of image frames;
   a pre-trained model comprising a plurality of images with high-level image features in an optimal scan plane;
   a processor configured to:
      extract a high-level feature from each of the plurality of image frames;
      compare the similarity of the extracted high-level feature with respective ones of the high-level image features in the pre-trained model;
      determine out-of-plane frames of the ultrasound images based on the comparison; and
      remove the out-of-plane frames from the ultrasound images based on a criterion to provide an optimized set of frames; and
   a display in communication with the processor and configured to display (306) the optimized set of frames.

2. The system of claim 1, further comprising:
   an ultrasound transducer probe in communication with the processor and which provides the source of the ultrasound image sequence,
   wherein the processor is further configured to provide an alert via a system aural or visual indicator based on the processor determining an out-of-plane frame.

3. The system of claim 2, wherein the processor is further configured to provide the alert during an ultrasound examination, and wherein the alert is an examination guidance instruction.

4. The system of claim 1, further comprising a computer memory in communication with the processor, wherein the processor stores the optimized set of frames in the computer memory.

5. The system of claim 1, further comprising:
a database in communication with the processor and which provides the source of the ultrasound image sequence,
wherein the display further indicates a metric related to the optimized set of frames.

6. The system of claim 1, wherein the pre-trained model comprises a Siamese Network with Triplet Loss which is pre-trained by:
obtaining a set of cine-loops, each cine-loop comprising a plurality of time-sequenced ultrasound images having a known minimal motion artifact,
randomly selecting an anchor frame from one of the cine-loops, a positive frame from the same one of the cine-loops, and a negative frame from another of the cine-loops;
extracting a high-level image feature from each of the anchor, positive, and negative image frames using a convolutional neural network (CNN);
calculating a triplet loss in a high-level features space between the respective high-level image features in the anchor, positive, and negative image frames;
minimizing the triplet loss by adjusting the CNN in the extracting step; and
obtaining a similarity distance measure between each of the anchor, positive, and negative image frames in the high-level features space,
wherein the comparing step uses the similarity distance measure.

7. The system of claim 6, wherein the criterion is a threshold numerical metric representative of the similarity distance.

8. The system of claim 1, wherein the processor and display are further configured to display the plurality of image frames in their entirety, and wherein the system further comprises:
a user interface configured to permit selection of the optimized set of frames.

9. The system of claim 1, wherein the ultrasound images comprise a time-sequenced set of contrast-enhanced ultrasound (CEUS) images.

10. A method of displaying an optimized time-arranged sequence of contrast-enhanced ultrasound (CEUS) images, the method comprising:
obtaining a source of a CEUS image sequence comprising a plurality of image frames;
extracting a high-level feature from each of the plurality of image frames;
obtaining a pre-trained model comprising a plurality of images with high-level image features in an optimal scan plane;
comparing the extracted high-level feature to the respective high-level image features in the provided pre-trained model and generating a similarity distance for each image frame;
determining which of the plurality of image frames in the CEUS sequence is an out-of-plane frame based on the comparing step and a criterion;
generating an optimized set of CEUS frames by removing a determined out-of-plane frame; and
displaying the optimized set of CEUS frames.

11. The method of claim 10, wherein the step of obtaining a source of a CEUS image sequence comprises obtaining CEUS images in real time from an ultrasound transducer probe.

12. The method of claim 11, further comprising a step of outputting one or more of a user guidance instruction, aural alert, or visual indication based on the determining step.

13. The method of claim 10, wherein the step of obtaining a source of a CEUS image sequence comprises obtaining CEUS images from a database of images from an ultrasound examination.

14. The method of claim 13, further comprising a step of selecting either of the obtained CEUS image frames or the optimized CEUS frames in the displaying step.

15. A training method comprising a Siamese Network with Triplet Loss which is pre-trained to automatically detect out-of-plane frames from a sequence of ultrasound images, comprising the steps of:
obtaining a set of cine-loops, each cine-loop comprising a plurality of time-sequenced ultrasound images having a known minimal motion artifact,
randomly selecting an anchor frame from one of the cine-loops, a positive frame from the same one of the cine-loops, and a negative frame from another of the cine-loops;
extracting a high-level image feature from each of the anchor, positive, and negative image frames using a convolutional neural network (CNN);
calculating a triplet loss in a high-level features space between the respective high-level image features in the anchor, positive, and negative image frames;
minimizing the triplet loss by adjusting the CNN in the extracting step; and
obtaining a similarity distance measure between each of the anchor, positive, and negative image frames in the high-level features space.

16. A computer program product comprising a computer program embodied in a tangible non-transitory computer-readable storage medium, which when executed by a processor, cause the processor to:
obtain a source of a CEUS image sequence comprising a plurality of image frames;
extract a high-level feature from each of the plurality of image frames;
obtain a pre-trained model comprising a plurality of images with high-level image features in an optimal scan plane;
compare the extracted high-level feature to the respective high-level image features in the provided pre-trained model;
determine which of the plurality of image frames in the CEUS sequence is an out-of-plane frame based on the comparing step and a criterion;
generate an optimized set of CEUS frames by removing a determined out-of-plane frame; and
display the optimized set of CEUS frames.

17. The computer program product of claim 16, wherein the computer program, when executed by the processor to determine the out-of-plane frames, further cause the processor to:
display a source CEUS image sequence in their entirety; and
permit selection of the optimized set of CEUS frames at a user interface.

18. The computer program product of claim 16, wherein the pre-trained model comprises a Siamese Network with Triplet Loss.

19. The computer program product of claim 16, wherein the computer program, when executed by the processor to determine the out-of-plane frames, further cause the processor to output one or more of a user guidance instruction, aural alert, or visual indication based on the determining.

20. The computer program product of claim 16, wherein the instructions, when executed by the processor to determine the out-of-plane frames, further cause the processor determine the out-of-plane frames at a rate greater than 100 frames per second.

\* \* \* \* \*